(12) United States Patent
Lewandowski et al.

(10) Patent No.: US 7,531,595 B2
(45) Date of Patent: May 12, 2009

(54) PRESSURE-SENSITIVE ADHESIVE CONTAINING SILICA NANOPARTICLES

(75) Inventors: Kevin M. Lewandowski, Inver Grove Heights, MN (US); Timothy D. Filiatrault, Maplewood, MN (US); Kelly S. Anderson, Houlton, WI (US); Babu N. Gaddam, Woodbury, MN (US); Eugene G. Joseph, Vadnais Heights, MN (US); Ying-Yuh Lu, Woodbury, MN (US); John J. Stofko, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 493 days.

(21) Appl. No.: 11/276,638

(22) Filed: Mar. 8, 2006

(65) Prior Publication Data
US 2007/0213449 A1 Sep. 13, 2007

(51) Int. Cl.
*C08K 3/36* (2006.01)
(52) U.S. Cl. ............ 524/493; 524/492; 524/500; 524/502; 524/515; 524/523; 524/556; 524/847
(58) Field of Classification Search ............ 524/493
See application file for complete search history.

(56) References Cited

U.S. PATENT DOCUMENTS

| | | | |
|---|---|---|---|
| 2,801,185 A | 7/1957 | Iler | |
| RE24,906 E | 12/1960 | Ulrich | |
| 3,225,013 A | 12/1965 | Fram | |
| 3,691,140 A | 9/1972 | Silver | |
| 3,925,442 A | 12/1975 | Samour | |
| 3,983,166 A | 9/1976 | Samour | |
| 4,166,152 A | 8/1979 | Baker et al. | |
| 4,278,578 A | 7/1981 | Carpenter | |
| 4,490,505 A | 12/1984 | Pendergrass, Jr. | |
| 4,495,318 A | 1/1985 | Howard | |
| 4,522,958 A | 6/1985 | Das et al. | |
| 4,636,432 A | 1/1987 | Shibano et al. | |
| 4,656,218 A | 4/1987 | Kinoshita | |
| 4,710,536 A | 12/1987 | Klingen et al. | |
| 4,737,559 A | 4/1988 | Kellen et al. | |
| 4,769,617 A | 9/1988 | Mizuide | |
| 4,833,179 A | 5/1989 | Young et al. | |
| 4,916,198 A | 4/1990 | Scheve et al. | |
| 5,045,569 A | 9/1991 | Delgado | |
| 5,114,901 A * | 5/1992 | Tsang et al. | ............ 502/240 |
| 5,116,676 A | 5/1992 | Winslow | |
| 5,126,394 A | 6/1992 | Revis et al. | |
| 5,221,497 A | 6/1993 | Watanabe et al. | |
| 5,286,843 A * | 2/1994 | Wood | ............ 528/482 |
| 5,292,844 A | 3/1994 | Young et al. | |
| 5,464,916 A | 11/1995 | Young et al. | |
| 5,508,107 A | 4/1996 | Gutman et al. | |
| 5,534,391 A | 7/1996 | Wang | |
| 5,597,512 A | 1/1997 | Watanabe et al. | |
| 5,641,567 A | 6/1997 | Brown et al. | |
| 5,648,407 A | 7/1997 | Goetz et al. | |
| 5,885,708 A | 3/1999 | Lu et al. | |
| 5,914,162 A | 6/1999 | Bilkadi | |
| 5,939,182 A | 8/1999 | Huang et al. | |
| 6,048,611 A | 4/2000 | Lu et al. | |
| 6,103,316 A | 8/2000 | Tran et al. | |
| 6,248,815 B1 | 6/2001 | Papsin et al. | |
| 6,416,838 B1 | 7/2002 | Arney et al. | |
| 6,509,404 B1 | 1/2003 | Young et al. | |
| 6,534,237 B1 * | 3/2003 | Kawamura et al. | ........ 430/270.1 |
| 6,586,483 B2 | 7/2003 | Kolb et al. | |
| 6,677,008 B2 | 1/2004 | Chen et al. | |
| 6,753,051 B1 | 6/2004 | Landry-Coltrain et al. | |
| 6,842,288 B1 | 1/2005 | Liu et al. | |
| 7,393,901 B1 * | 7/2008 | Filiatrault et al. | ............ 525/222 |
| 2002/0128336 A1 * | 9/2002 | Kolb et al. | ............ 521/50 |
| 2003/0026967 A1 | 2/2003 | Joseph et al. | |
| 2003/0100670 A1 * | 5/2003 | Chen et al. | ............ 524/601 |
| 2003/0136510 A1 * | 7/2003 | Thakkar et al. | ............ 156/332 |
| 2003/0190464 A1 * | 10/2003 | Narum et al. | ............ 428/343 |
| 2004/0074598 A1 | 4/2004 | Ando et al. | |
| 2004/0086446 A1 * | 5/2004 | Jia et al. | ............ 423/335 |
| 2004/0116882 A1 * | 6/2004 | Erspamer et al. | ............ 604/359 |
| 2005/0016851 A1 | 1/2005 | Jensen et al. | |
| 2005/0062024 A1 | 3/2005 | Bessette et al. | |
| 2005/0064182 A1 | 3/2005 | Lunsford et al. | |

(Continued)

FOREIGN PATENT DOCUMENTS

DE        10304127        *    8/2004

(Continued)

OTHER PUBLICATIONS

Blackley, D.C., "Emulsion Polymerization: theory and practice", New York, J. Wiley (1975).

(Continued)

*Primary Examiner*—Marc S. Zimmer
*Assistant Examiner*—Nicole M Buie
(74) *Attorney, Agent, or Firm*—Kent S. Kokko

(57) ABSTRACT

An adhesive composition comprising an emulsion polymer which comprises a (meth)acrylate copolymer and silica nanoparticles is described. The addition of the nanoparticles results in a significant increase in the overlap shear properties.

23 Claims, No Drawings

U.S. PATENT DOCUMENTS

2006/0134362 A1 6/2006 Lu et al.
2006/0148944 A1* 7/2006 Baumgart et al. ........... 524/186

FOREIGN PATENT DOCUMENTS

| EP | 0 039 165 | 4/1981 |
| JP | 2001-172582 | 6/2001 |
| WO | WO89/12618 | 12/1989 |
| WO | WO96/26253 | 8/1996 |
| WO | WO 97/39837 A1 | 10/1997 |
| WO | WO99/29795 | 6/1999 |
| WO | WO02/064651 | 8/2002 |
| WO | WO 02/066571 A2 | 8/2002 |
| WO | WO03/029015 | 4/2003 |
| WO | WO2004/094549 | 11/2004 |

OTHER PUBLICATIONS

Roessler, R.R., et al., "Tris-3-(1-aziridono)propionates and their use in formulated products", *Progress in Organic Coatings*, vol. 50, pp. 1-27 (2004).

Spitael, P., et al., "Strain Hardening in Polypropylenes and its Role in Extrusion Foaming", *Polym. Eng. Science*, vol. 44, No. 11 pp. 2090-2100 (2004).

Wada, T., et al., "Properties of Organic-Inorganic Composite Materials Prepared from Acrylic Resin Emulsions and Colloidal Silicas", *J. Appl. Polymer Science*, vol. 101, pp. 2051-2056 (2006).

http://www.snowtex.com/snowtex.htm, © 2001-2004 Nissan Chemical Industries, pp. 1-5.

U.S. Appl. No. 11/276,637, filed Mar. 8, 2006 entitled "High Shear Pressure-Sensitive Adhesive".

U.S. Appl. No. 11/549,162, filed Oct. 13, 2006 entitled "2-Octyl (Meth)acrylate Adhesive Composition".

U.S. Appl. No. 11/676,131, filed Feb. 16, 2007 entitled "Acrylate Adhesives Containing Silica Nanoparticles Crosslinked with Polyfunctional Aziridines".

U.S. Appl. No. 11/676,116, filed Feb. 17, 2007 entitled "Pressure-sensitive Adhesive Containing Acicular Silica Particles Crosslinked with Polyfunctional Aziridines".

* cited by examiner

PRESSURE-SENSITIVE ADHESIVE CONTAINING SILICA NANOPARTICLES

BACKGROUND OF THE INVENTION

Pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

U.S. Pat. No. Re. 24,906 (Ulrich) discloses a pressure-sensitive adhesive tape, the adhesive layer of which comprises a copolymer of acrylic acid ester and a copolymerizable monomer such as acrylic acid, described therein as an "acrylic pressure-sensitive adhesive tape". Although acrylic pressure-sensitive adhesive tape may provide acceptable strength and good adhesion, there has been a need for even higher shear strength, especially at elevated temperatures, without any reduction in adhesion, particularly in peel strength.

SUMMARY

The present invention is directed to an adhesive composition comprising a (meth)acrylate copolymer and silica nanoparticles having a high aspect ratio. Preferably the silica nanoparticles are acicular (needle-like). In another embodiment, the present invention provides an aqueous emulsion of a (meth)acrylate copolymer and silica nanoparticles, that may be coated and dried to produce a pressure-sensitive adhesive article. The addition of the nanoparticles results in a significant increase in the overlap shear properties of the adhesive. Advantageously, only a small amount of nanoparticles (1-8 weight percent, relative to the weight of the adhesive (meth) acrylate copolymer) are needed to observe the increase in shear properties with the acrylic pressure-sensitive adhesives described herein. Further, applicants have observed that the acicular silica nanoparticles have a reduced tendency to agglomerate, with the present adhesive polymer, relative to spherical silica nanoparticles having the same diameter.

For environmental reasons, there is a desire to move away from the use of volatile organic solvents (VOC's) in coating processes, and towards more environmentally friendly water-based materials, so the present invention provides a water-borne adhesive comprising an emulsion (meth)acrylate copolymer and a nanoparticle silica sol. Waterborne systems are desirable for cost, environmental, safety, and regulatory reasons. The aqueous system may be readily coated, and provides a pressure-sensitive adhesive when dried.

As used herein:

"emulsion" refers to a stable mixture of two or more immiscible liquids held in suspension by one or more surfactants, more specifically it refers to a stable mixture of the instant polymerizable monomer mixture, or resultant polymer, and water;

"latex" refers to an aqueous suspension or emulsion of a polymer, more specifically it refers to an aqueous emulsion of the instant polymer;

"oil-in-water emulsion" refers to a mixture in which the water forms a continuous phase and the monomers (oil) is in discontinuous droplets;

"oil phase" in an oil-in-water emulsion refers to all components in the formulation that individually exceed their solubility limit in the water phase; these are materials that generally have solubilities of less than 1% in distilled water, however, water phase components such as salts may decrease the solubility of certain oils resulting in their partitioning into the oil phase;

"water phase" in a oil-in-water emulsion refers to the water present and any components that are water soluble, i.e., have not exceeded their solubility limit in water;

"(meth)acrylate monomers" are acrylic acid esters or methacrylic acid esters of alcohols;

As used herein, the term "silica sol" refers to a dispersion of discrete, amorphous silica particles in a liquid, typically water.

"hydrophobic" is used herein to mean that the monomer lacks substantial affinity for water, that is, it neither substantially adsorbs nor absorbs water at room temperature.

"hydrophilic" in the context of silica nanoparticles refers to those nanoparticles that are readily dispersed in water. In the context of monomers, it refers to monomers that have a substantial affinity for water.

DETAILED DESCRIPTION

The present invention provides a pressure-sensitive adhesive comprising:
(a) a polymer comprising:
  (i) 90 to 99 parts by weight, preferably 90 to 95 parts by weight, of an (meth)acrylic acid ester of non-tertiary alcohol, said alcohol having from 1 to 14 carbon atoms, preferably with the average number of carbon atoms being from about 4 to about 12;
  (ii) 1 to 10 parts by weight, preferably 2 to 7 parts by weight, of an acid functional monomer;
  (iii) 0 to 10 parts by weight of a second, non-acid functional, polar monomer;
  (iv) 0 to 5 parts vinyl monomer;
  (v) optionally 0.01 to 1 part by weight of a crosslinking agent; and
(b) 1 to 8 parts by weight, preferably 2 to 5 parts by weight, of silica nanoparticles having an average particle diameter of 9-25 nm with a length of 40-300 nm, based on 100 parts of polymer. Preferably the particles are acicular.

The present invention further provides a latex comprising:
(a) 30 to about 70 weight percent, based on the total weight of the emulsion, of a polymer phase comprising the polymerization reaction product of:
  (i) 90 to 99 parts by weight, preferably 90 to 95 parts be weight, of an (meth)acrylic acid ester of non-tertiary alcohol, said alcohol having from 1 to 14 carbon atoms, with the average number of carbon atoms being from about 4 to about 12;
  (ii) 1 to 10 parts by weight, preferably 2 to 7 parts by weight, of an acid functional monomer;
  (iii) 0 to 10 parts by weight of a second, non-acid functional, polar monomer;
  (iv) 0 to 5 parts by weight of vinyl monomer;
  (v) optionally 0.01 to 1 part by weight of a crosslinking agent,
  (vi) 0.5 parts by weight of a chain transfer agent
  (vii) parts by weight, preferably 2 to 5 parts by weight, of silica nanoparticles (preferably acicular) having an average particle diameter of 9-25 nm with a length of 40-300 nm, based on 100 parts of polymer. Preferably the particles are acicular, wherein the sum of (i) through (vii) is 100 parts by weight, and (b) 30 to 70 weight percent of an aqueous phase comprising 0.5 to about 8 weight percent of a surfactant, preferably an anionic surfactant, based on the total weight of the emulsion.

Preferably the emulsion comprises about 50 to about 65 percent by weight polymer (or a mixture of such polymers) and about 35 to about 50 percent by weight aqueous phase, most preferably about 55 to about 62 percent by weight solid phase and about 38 to about 45 percent by weight aqueous phase, based upon the total weight of the emulsion, in order to minimize the aqueous phase and thus conserve energy during the drying of the latex, in order to minimize storage and shipping costs, and in order to maximize plant productivity. The emulsion may be coated and dried to produce a pressure-sensitive adhesive.

The acrylate ester monomer useful in preparing the adhesive polymer is a hydrophobic monomeric (meth)acrylic ester of a non-tertiary alcohol, which alcohol contains from 1 to 14 carbon atoms and preferably an average of from 4 to 12 carbon atoms.

Examples of monomers suitable for use as the acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 1-dodecanol, 1-tridecanol, 1-tetradecanol and the like. In some embodiments, the preferred acrylate ester monomer is the ester of acrylic acid with butyl alcohol or isooctyl alcohol, or a combination thereof, although combinations of two or more different acrylate ester monomer are suitable.

The acrylate ester monomer is preferably present in an amount of 90 to 99 parts by weight based on 100 parts total monomer content used to prepare the polymer (i.e. the total of i through v in the composition supra). More preferably acrylate ester monomer is present in an amount of 90 to 95 parts by weight based.

The polymer further comprises an acid functional monomer, where the acid functional group may be an acid per se, such as a carboxylic acid, or a salt thereof such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the present invention are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 1 to 10 parts by weight, preferably 1 to 5 parts by weight, based on 100 parts by weight total monomer.

The polar monomers useful in preparing the adhesive are both somewhat oil soluble and water soluble, resulting in a distribution of the polar monomer between the aqueous and oil phases in an emulsion polymerization. Useful second polar monomers are non-acid functional.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)acrylates including 2-(2-ethoxyethoxy) ethyl acrylate, 2-ethoxyethyl acrylate, 2-methoxyethoxyethyl acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone.

When used, vinyl monomers useful in the acrylate polymer include vinyl esters (e.g., vinyl acetate and vinyl propionate), styrene, substituted styrene (e.g., α-methyl styrene), vinyl halide, and mixtures thereof. Such vinyl monomers are generally used at 0 to 5 parts by weight, preferably 1 to 5 parts by weight, based on 100 parts by weight total monomer.

In order to increase cohesive strength of the coated adhesive composition, a crosslinking additive may be incorporated into the blend or polymerizable monomers. Multi-functional acrylates are particularly useful for emulsion polymerization. Examples of useful multi-functional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof. Crosslinking may also be achieved using high energy electromagnetic radiation such as gamma, UV or e-beam radiation.

The amount and identity of crosslinker is tailored depending upon application of the adhesive composition. Typically, the crosslinker is present in amounts less than 5 parts based on total dry weight of adhesive composition. More specifically, the crosslinker is present in amounts from 0.01 parts to 1 part based on 100 parts total monomers of the adhesive composition.

The composition further comprises silica nanoparticles, preferably acicular, generally used and compounded in the form of a colloidal dispersion that does not readily precipitate or agglomerate. The acicular colloidal silica particles should have a uniform thickness of 5 to 40 nm, a diameter $D_1$ of 40 to 500 nm (as measured by dynamic light-scattering method) and a degree of elongation $D_1/D_2$ of 5 to 30, wherein $D_2$ means a diameter in nm calculated by the equation $D_2=2720/S$ and S means specific surface area in $m^2/g$ of the particle, as is disclosed in the specification of U.S. Pat. No. 5,221,497, incorporated herein by reference.

U.S. Pat. No. 5,221,497 discloses a method for producing acicular silica nanoparticles by adding water-soluble calcium salt, magnesium salt or mixtures thereof to an aqueous colloidal solution of active silicic acid or acidic silica sol having a mean particle diameter of 3 to 30 nm in an amount of 0.15 to 1.00 wt. % based on CaO, MgO or both to silica, then adding an alkali metal hydroxide so that the molar ratio of $SiO_2/M_2O$ (M: alkali metal atom) becomes 20 to 300, and heating the obtained liquid at 60 to 300° C. for 0.5 to 40 hours. The colloidal silica particles obtained by this method are elongate-shaped silica particles that have elongations of a uniform thickness within the range of 5 to 40 nm extending in only one plane.

The acicular silica sol may also be prepared as described by Watanabe et al. in U.S. Pat. No. 5,597,512. Briefly stated, the method comprises: (a) mixing an aqueous solution containing a water-soluble calcium salt or magnesium salt or a mixture of said calcium salt and said magnesium salt with an aqueous colloidal liquid of an active silicic acid containing from 1 to 6% (w/w) of $SiO_2$ and having a pH in the range of from 2 to 5 in an amount of 1500 to 8500 ppm as a weight ratio of CaO or MgO or a mixture of CaO and MgO to $SiO_2$ of the active silicic acid; (b) mixing an alkali metal hydroxide or a water-soluble organic base or a water-soluble silicate of said alkali metal hydroxide or said water-soluble organic base with the aqueous solution obtained in step (a) in a molar ratio of $SiO_2/M_2O$ of from 20 to 200, where $SiO_2$ represents the total silica content derived from the active silicic acid and the silica content of the silicate and M represents an alkali metal atom or organic base molecule; and (c) heating at least a part of the mixture obtained in step (b) to 60° C. or higher to obtain a heel solution, and preparing a feed solution by using another part of the mixture obtained in step (b) or a mixture prepared separately in accordance with step (b), and adding said feed solution to said heel solution while vaporizing water from the mixture during the adding step until the concentration of $SiO_2$ is from 6 to 30% (w/w). The silica sol produced in step (c) typically has a pH of from 8.5 to 11.

Useful acicular silica nanoparticles may be obtained as an aqueous suspension under the trade name SNOWTEX-UP by Nissan Chemical Industries (Tokyo, Japan). The mixture consists of 20-21% (w/w) of acicular silica, less than 0.35% (w/w) of $Na_2O$, and water. The particles are about 9 to 15 nanometers in diameter and have lengths of 40 to 300 nanometers. The suspension has a viscosity of <100 mPas at 25° C., a pH of about 9 to 10.5, and a specific gravity of about 1.13 at 20° C.

Other useful silica nanoparticle may be obtained as an aqueous suspension under the trade name SNOWTEX-PS-S and SNOWTEX-PS-M by Nissan Chemical Industries, having a morphology of a string of pearls. The mixture consists of 20-21% (w/w) of silica, less than 0.2% (w/w) of $Na_2O$, and water. The SNOWTEX-PS-M particles are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The SNOWTEX-PS-S has a particle diameter of 10-15 nm and a length of 80-120 nm.

The composition may further comprises a spherical silica nanoparticles having an average particle diameter of 20 nanometers of less. That is, the composition may comprises 1 to 8 parts by weight of acicular silica nanoparticles and 0 to 8 parts by weight of spherical silica nanoparticles, with the total being 1 to 8 parts by weight. In some embodiments up to 50% of the acicular silica nanoparticles may be substituted by spherical nanoparticles. Colloidal silica is a dispersion of substantially spherical, submicron-sized silica ($SiO_2$) particles in an aqueous or other solvent medium. The nanoparticles used in the invention may be acid stabilized or base stabilized. The colloidal silicas used in this composition are dispersions of submicron size silica particles in an aqueous or in a water/organic solvent mixture and having and average particle diameter of 20 nanometers or less, preferably 10 nanometers or less, and more preferably 5 nanometers or less. The average particle size may be determined using transmission electron microscopy. Further, the nanoparticles generally have a surface area greater than about 150 $m^2/gram$, preferably greater than 200 $m^2/gram$, and more preferably greater than 400 $m^2/gram$. For the greatest improvement in shear values, the particles preferably have narrow particle size distributions, that is, a polydispersity of 2.0 or less, preferably 1.5 or less. If desired, minor amounts of larger silica particles may be added, but such additions do not contribute to the increase in shear values.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del., USA), NYACOL (available from Nyacol Co., Ashland, Mass.) or NALCO (manufactured by Ondea Nalco Chemical Co., Oak Brook, Ill. USA). One useful silica sol is NALCO 2326 available as a silica sol with mean particle size of 5 nanometers, pH 10.5, and solid content 15% by weight.

Non-aqueous silica sols (also called silica organosols) may also be used and are silica sol dispersions wherein the liquid phase is an organic solvent, or an aqueous organic solvent. In the practice of this invention, the silica sol is chosen so that its liquid phase is compatible with the emulsion, and is typically aqueous or an aqueous organic solvent.

In some embodiments, the nanoparticles may be surface-modified. A surface-modified nanoparticle is a particle that includes surface groups attached to the surface of the particle. The surface groups modify the hydrophobic or hydrophilic nature of the particle. In some embodiments, the surface groups may render the nanoparticles more hydrophobic. In some embodiments, the surface groups may render the nanoparticles more hydrophilic. The surface groups may be selected to provide a statistically averaged, randomly surface-modified particle. In some embodiments, the surface groups are present in an amount sufficient to form a monolayer, preferably a continuous monolayer, on the surface of the particle. Generally, less than 25% of the available surface functional groups (i.e. Si—OH groups) are modified with a hydrophilic surface-modifying agent to retain hydrophilicity and dispersibility, and are modified with a hydrophilic surface-modifying agent. It is preferred that the silica nanoparticles are not surface modified, although they may be acid- or base-stabilized.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. No. 2,801,185 (Iler) and U.S. Pat. No. 4,522,958 (Das et al.).

Surface modifying groups may be derived from surface modifying agents. Schematically, surface modifying agents can be represented by the formula A-B, where the A group is capable of attaching to the surface of the particle (i.e. the Si—OH groups) and the B group is a compatibilizing group that does not react with other components in the system (e.g., the adhesive and/or the substrate). Compatibilizing groups can be selected to render the particle relatively more polar, relatively less polar or relatively non-polar. Preferably the compatiblizing group is a hydrophilic group such as an amino group, acid group or poly(oxyethylene) group. Suitable classes of surface-modifying agents include, e.g., silanes, organic acids, organic bases and alcohols.

Other additives can be added in order to enhance the performance of the adhesive compositions. For example, leveling agents, ultraviolet light absorbers, hindered amine light stabilizers (HALS), oxygen inhibitors, wetting agents, rheology modifiers, defoamers, biocides, dyes and the like, can be included herein. All of these additives and the use thereof are well known in the art. It is understood that any of these compounds can be used so long as they do not deleteriously affect the adhesive properties.

Also useful as additives to the present compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl) [3,5-bis(1,1-dimethylethyl-4-hydroxyphenyl) methyl]butylpropanedioate, available as Tinuvin™144, from CIBA-GEIGY Corporation, Hawthorne, N.Y.

The following UV absorbers and combinations thereof in concentrations of less than parts by weight based on the total monomer composition, may produce desirable results: bis(1, 2,2,6,6-pentamethyl-4-piperidinyl)(3,5-bis(1,1-dimethyl-ethyl 1-4-hydroxyphenyl)methyl) butylpropanedioate, 2-ethylhexyl-2-cyano-3,3'-diphenylacrylate, 2-hydroxyl-4-n-octoxybenzophenone, 2-(2'-hydroxy-5'-methylphenyl) benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and Uvinul® D-50 and MS-40, sold by BASF Wyandotte Inc., Parsippany, N.J. Concentrations of UV absorbers, however, in the range of 1 to 5 percent based on the total weight of the composition are preferred.

The polymers herein may be prepared by any conventional free radical polymerization method, including solution, radiation, bulk, dispersion, emulsion, and suspension processes. The acrylate polymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado). Each describes adhesive compositions, and the descriptions of polymerization processes are incorporated herein by reference. Preferably, the acrylate polymer is prepared by an emulsion polymerization process in the presence of a free-radical initiator.

Water-soluble and oil-soluble initiators useful in preparing the acrylate adhesive polymers used in the present invention are initiators that, on exposure to heat, generate free-radicals which initiate (co)polymerization of the monomer mixture. Water-soluble initiators are preferred for preparing the acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO 64 (2,2'-azobis(isobutyronitrile)) and VAZO 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

The copolymerizable emulsion mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. The preferred chain transfer agents are isooctylthioglycolate and carbon tetrabromide. The emulsion mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof.

Useful anionic surfactants include but are not limited to those whose molecular structure includes at least one hydrophobic moiety selected from the group consisting of from about $C_6$- to $C_{12}$-alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate, and the like, and the salts of such anionic groups, wherein said salts are selected from the group consisting of alkali metal salts, ammonium salts, tertiary amino salts, and the like. Representative commercial examples of useful anionic surfactants include sodium lauryl sulfate, available from Stepan Chemical Co. as POLYSTEP B-3; sodium lauryl ether sulfate, available from Stepan Chemical Co. as POLYSTEP B-12; and sodium dodecyl benzene sulfonate, available from Rhone-Poulenc as SIPONATE DS-10.

Useful nonionic surfactants include but are not limited to those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include but are not limited to nonylphenoxy or octylphenoxy poly (ethyleneoxy)ethanols available from Rhone-Poulenc as the IGEPAL CA or CO series, respectively; $C_{11}$-$C_{15}$ secondary-alcohol ethoxylates available from Union Carbide as the TERGITOL 15-S series; and polyoxyethylene sorbitan fatty acid esters available from ICI Chemicals as the TWEEN series of surfactants.

Useful cationic surfactants include alkylammonium salts having the formula $C_nH_{2n+1}N^+(CH_3)_3X^-$, where X is OH, Cl, Br, $HSO_4$ or a combination thereof, and where n is an integer from 8 to 22, and the formula $C_nH_{2n+1}N^+(C_2H_5)_3X^-$, where n is an integer from 12 to 18; gemini surfactants, for example those having the formula: $[C_{16}H_{33}N^+(CH_3)_2C_mH_{2m+1}]X^-$, wherein m is an integer from 2 to 12 and X is as defined above; aralkylammonium salts such as, for example, benzalkonium salts; and cetylethylpiperidinium salts, for example, $C_{16}H_{33}N^+(C_2H_5)(C_5H_{10})X^-$, wherein X is as defined above.

Alternatively, the surfactant may be an ionic surfactant copolymerizable with the monomer mixtures, and is incorporated into the polymer chain during polymerization. Examples of useful copolymerizable ionic surfactants include but are not limited to those described in WO 89/12618

(Tang et al.). The surfactants described therein have a hydrophobic portion containing alpha-beta ethylenic unsaturation, a hydrophilic portion containing a poly(alkyleneoxy) segment, and an ionic segment.

According to WO 89/12618, the reactive surfactants arise from successive condensation polymerizations of an ethylenically-unsaturated alcohol with a prescribed amount of a first cyclic ether, e.g., propylene oxide, butylene oxide or a mixture thereof, followed by condensation with a prescribed amount of ethylene oxide. Cationic or anionic end-group functionality is added via the terminal hydroxyl group, as desired.

The ionic copolymerizable surfactant has at least one group, preferably one group, capable of reacting with the copolymerizable monomer mixture. Such reactive groups include but are not limited to those groups selected from the group consisting of ethylenically unsaturated groups such as vinyl groups, acrylate groups, etc.

The preferred copolymerizable surfactant, which has the trade name MAZON SAM-211, is available from PPG Industries, Inc. and is described as an alkylene polyalkoxy ammonium sulfate, wherein the number of alkoxy groups is between about 5 and about 25, with a typical example having about 15 to about 20 ethoxy groups. Examples of additional useful copolymerizable surfactants include alkyl allyl sulfosuccinates such as TREM-LF40, available from Diamond Shamrock Company. Additional useful copolymerizable surfactants are disclosed in U.S. Pat. Nos. 3,925,442 and 3,983,166, assigned to The Kendall Company, both incorporated by reference herein.

It is also envisioned that the emulsion of the present invention can be made using a mixture of a copolymerizable surfactant as delineated above and a typical ionic or nonionic noncopolymerizable surfactant commonly known in the art of latex polymerization, in place of the ionic copolymerizable surfactant above. Example of such noncopolymerizable surfactants can be found in "Emulsion Polymerization: theory and practice", by D. C. Blackley, New York, J. Wiley (1975), incorporated by reference herein. In some embodiments, the surfactant mixture comprises about 40 to about 99.5 percent by weight of an ionic copolymerizable surfactant and about 0.5 to about 60 percent by weight of a noncopolymerizable surfactant, based upon the total weight of the surfactant mixture.

Preferably, the emulsion polymerization of this invention is carried out in the presence of anionic surfactant(s). A useful range of emulsifier concentration is from about 0.5 to about 8 weight percent, preferably from about 1 to about 5 weight percent, based on the total weight of all monomers of the emulsion pressure-sensitive adhesive.

The emulsion pressure-sensitive adhesives of the invention may also contain one or more conventional additives. Preferred additives include tackifiers, plasticizers, dyes, antioxidants, and UV stabilizers. Such additives can be used if they do not affect the adhesive properties of the emulsion pressure-sensitive adhesives.

If tackifiers are used, then up to about 40% by weight, preferably less than 30% by weight, and more preferably less than 5% by weight based on the dry weight of the total adhesive polymer and silica, would be suitable. In some embodiments, 25 to about 60 phr (parts per hundred parts resin) based on dry weight of the total adhesive component would also be suitable. Suitable tackifiers for use with acrylate emulsions include rosin acids, rosin esters, terpene phenolic resins, hydrocarbon resins, and cumarone indene resins. The type and amount of tackifier can affect properties such as contactability, bonding range, bond strength, heat resistance and specific adhesion. The tackifier will generally be used in the form of an aqueous dispersion. Commercially available tackifiers that are suitable include TACOLYN 1070, 5001 and 5002 (aqueous, 55% solids synthetic resin dispersions based on low molecular weight thermoplastic resins, available from Hercules Inc.), SE1055 (an aqueous dispersion of a rosin ester, available from Hercules Inc.), ESCOREZ 9271 (an aliphatic hydrocarbon resin emulsion, available from Exxon), DERMULSENE 82, DERMULSENE 92, DERMULSENE DT or DERMULSENE DT50 (aqueous dispersions of modified terpene phenolic resins, available from DRT) and AQUATAK 4188 (a modified rosin ester, available from Arizona Chemical Company).

The acrylate copolymer may be prepared by an emulsion polymerization process. In emulsion polymerization a reaction occurs in micelles or emulsion microdrops suspended in aqueous medium. Any heat generated in the microdrops or micelles is quickly moderated by the effect of the heat capacity of the surrounding water phase. Emulsion polymerization proceeds with better control of exothermic reactions, and the resulting adhesive composition is non-flammable as the aqueous medium is the dominant component.

The pressure-sensitive adhesives of the present invention are prepared by a batch, continuous or semi-continuous emulsion polymerization process. The batch polymerization generally comprises the steps of:
(a) making a monomer premix comprising
  (i) an acrylic acid ester,
  (ii) an acid functional monomer;
  (iii) optionally a polar monomer,
  (iv) optionally a vinyl monomer,
  (v) optionally a crosslinking agent,
  (vi) optionally a chain transfer agent,
(b) combining said premix with a water phase comprising
  (i) water,
  (ii) a surfactant selected from the group consisting of anionic surfactants, nonionic surfactants, cationic surfactants, amphoteric surfactants, polymeric surfactants, and mixtures thereof,
  (iii) a water soluble free radical initiator,
(c) concurrently agitating and heating said emulsion to a temperature of about 30° C. to about 80° C., and permitting polymerization of said monomers in the oil-in-water emulsion until a polymeric latex is formed. It will be understood that other mixtures may be used. For example, the acid functional monomer, or other hydrophilic monomers, may be added to the aqueous solution. In addition, once the emulsion mixture is prepared, the monomers may partition between the oil phase and the water phase, according to their respective partition coefficients.

In the semicontinuous process, a flask is charged with a seed monomer mixture comprising deionized (DI) water, surfactant, acid functional monomers, acrylate ester monomers, optional co-polymerizable monomers, including optional polar monomers, plus any optional chain transfer agents, pH modifiers or other additives. The mixture is stirred and heated under an inert atmosphere such as a nitrogen blanket. When the mixture has reached induction temperature, typically about 50 to about 70° C., the first initiator is added to initiate the polymerization and the reaction is allowed to exotherm. After the seed reaction is completed, the batch temperature is then raised to the feed reaction temperature, about 70 to about 85° C. At the feed reaction temperature, the monomer preemulsion comprising DI water, surfactant, acid functional monomers, acrylate ester monomers, optional co-polymerizable monomers, including optional polar monomers, chain transfer agents or other additives is added to the stirred flask over a period of time, typically 2 to 4 hours, while the temperature is maintained. At end of the feed reaction, the second initiator charge, if used, is added to the reaction to further reduce residual monomers in the emulsion. After additional hour of heating, the mixture is cooled to room temperature (about 23° C.) and the emulsion is collected for evaluation.

A neutralizing agent may be employed in the preparation of this polymer. It may be employed at a level sufficient to neutralize all or a part of the acid groups of the polymer. Generally, less than 50% of acid groups are neutralized. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount selected must not render the adhesive non-dispersible. Preferably ammonium, sodium and potassium hydroxide are used as neutralizing agents.

The pH of the emulsion is typically about 2-6. The acidity of the emulsion may be modified following latex formation using a pH modifier such as a basic solution (e.g., solutions of sodium hydroxide, ammonium hydroxide, lithium hydroxide and the like) or buffer solutions (e.g., sodium bicarbonate and the like), to less acidic levels. Preferably, the pH is 7 or less, more preferably, the pH is in the range of 2 to 6, and most preferably between 3 and 6. It is believed there is a balance between the pH of the composition and adhesive performance thereof. As the acid groups of the polymer are neutralized by the addition of base, the stability of the emulsion increases, but hydrogen bonding between the acid groups of the polymer and the silica nanoparticles is reduced.

In order to increase cohesive strength of the poly(meth) acrylate pressure-sensitive adhesives, a crosslinking additive may be incorporated into the polymer post-polymerization. Two main types of crosslinking additives are exemplary. The first crosslinking additive is a thermal crosslinking additive such as multifunctional aziridine, isocyanate and epoxy. One example of aziridine crosslinker is 1,1'-(1,3-phenylene dicarbonyl)-bis-(2-methylaziridine) (CAS No. 7652-64-4). Common polyfunctional isocyanate crosslinkers are trimethylolpropane toluene diisocyanate, toluene diisocyanate, etc. Such chemical crosslinkers can be added into solvent-based PSAs after polymerization and activated by heat during oven drying of the coated adhesive.

In another embodiment, chemical crosslinkers, which rely upon free radicals to carry out the crosslinking reaction, may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide and isocyanate reagents. The second type of crosslinking additive is a photosensitive crosslinker, which is activated by high intensity ultraviolet (UV) light. Two common photosensitive crosslinkers used for acrylic PSAs are benzophenone and copolymerizable aromatic ketone monomers as described in U.S. Pat. No. 4,737,559 (Kellen et al.) Another photo-crosslinker, which can be post-added to the solution polymer and activated by UV light is a triazine, for example, 2,4-bis (trichloromethyl)-6-(4-methoxy-phenyl)-s-triazine. These crosslinkers are activated by UV light generated from sources such as medium pressure mercury lamps or a UV blacklight.

Hydrolyzable, free-radically copolymerizable crosslinkers, such as monoethylenically unsaturated mono-, di-, and trialkoxy silane compounds including, but not limited to, methacryloxypropyltrimethoxysilane (available from Gelest, Inc., Tullytown, Pa.), vinyl dimethylethoxysilane, vinyl methyl diethoxysilane, vinyltriethoxysilane, vinyltrimethoxysilane, vinyltriphenoxysilane, and the like, are also useful crosslinking agents. Crosslinking may also be achieved using high energy electromagnetic radiation such as gamma or e-beam radiation. In this case, no crosslinker may be required.

The acicular silica sols may be incorporated into the acrylate adhesive by various methods. In one embodiment, an emulsion of the acrylate adhesive is added to the acicular silica sol, followed by optional removal of the water and co-solvent (if used) via evaporation, thus leaving the acicular silica nanoparticles dispersed in the acrylate adhesive. Alternatively, the acicular silica sol may be added to an emulsion of the acrylate adhesive. It is preferred that the acicular silica nanoparticles be blended under conditions of low shear to avoid precipitation of the acrylate emulsion. The evaporation step can be accomplished for example, via distillation, rotary evaporation or oven drying. Prior to drying, the emulsion generally does not exhibit pressure-sensitive adhesive properties, so drying to less than 5 wt. % water, preferably less than 1 wt. % water is desirable. It will be understood that the water content of the adhesive may increase with time, as the result of humidity.

In an alternate embodiment, the acicular silica nanoparticles can be filtered to obtain solids that can be dried into a powder. This method is useful when the particles of a surface modified aqueous sol have agglomerated due to the incompatibility of the surface treatment with the aqueous medium. The acrylate emulsion may then added to the dry, filtered particles to obtain the adhesives of the invention.

Once dispersed in the acrylate adhesive, the acicular silica nanoparticles are in a substantially discrete (individual) and unassociated (i.e. non-agglomerated, non-aggregated) condition. "Agglomerated" as used herein, is descriptive of a weak association of particles usually held together by charge or polarity and can be broken down into smaller entities. "Aggregated," as used herein, is descriptive of a strong association of particles often bound together by, for example, residual chemicals treatment; further breakdown of the aggregates into smaller entities is very difficult to achieve.

It is preferable to coat the adhesive composition soon after preparation. It has been found that the viscosity of the composition increases with time, and this viscosity increase is believed to be due to agglomeration of the silica nanoparticles.

The emulsion (containing the adhesive polymer and silica nanoparticles, preferably acicular) are easily coated upon suitable flexible backing materials by conventional coating techniques to produce adhesive coated sheet materials. The flexible backing materials may be any material conventionally utilized as a tape backing, optical film or any other flexible material. Typical examples of flexible backing materials employed as conventional tape backing that may be useful for the adhesive compositions include those made of paper, plastic films such as polypropylene, polyethylene, polyurethane, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure-sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-50 microns (dry thickness), preferably about 25 microns, are contemplated. The emulsions (containing the adhesive polymer, silica nanoparticles and water) may be of any desirable concentration for subsequent coating, but is typically between 30 to 70 wt. % water, and more typically between 50 and 65 wt. % water. The desired concentration may be achieved by further dilution of the emulsion, or by partial drying.

While the adhesives of the present invention are well suited for use in wet lamination applications, the adhesives also perform well in dry lamination applications, wherein the resultant lamination is subjected to high heat and humidity conditions.

To begin, pressure-sensitive adhesive is coated onto backings with the desired coating thickness and then dried before lamination. Then, water is sprayed onto glass or other substrate, sometimes along with a small amount of surfactant to lower the water's surface tension, to obtain a thin water layer on the substrate surface. The film is then positioned properly on the substrate, and most of the excess of water is squeezed out to yield a substrate/PSA/film laminate. The remaining water in the laminate will be evaporated in a few days, depending on the materials used in the laminate.

For dry lamination, a PSA is coated onto films (backings) with the desired coating thickness, and then dried before lamination. Such PSA coated film is then adhered onto substrate surface with pressure and/or high temperature to bond the film onto the substrate surface.

Suitable materials useful as the flexible support or backing for the adhesive articles of the invention include, but are not limited to, paper, latex saturated paper, polymeric film, cellulose acetate film, ethyl cellulose film, cloth (i.e., woven or nonwoven sheeting formed of synthetic or natural materials), metallic foil, and ceramic sheeting.

Examples of materials that can be included in the flexible support include polyolefins (such as polyethylene, polypropylene (including isotatic polypropylene), polystyrene, polyester, polyvinyl alcohol, poly(ethylene terephthalate), poly(butylene terephthalate), poly(caprolactam), poly(vinylidine fluoride), and the like. Commercially available backing materials useful in the invention include kraft paper (available from Monadnock Paper, Inc.); cellophane (available from Flexel Corp.); spun-bond poly(ethylene) and polypropylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

The flexible support may also comprise a release-coated substrate. Such substrates are typically employed when an adhesive transfer tape is provided. Examples of release-coated substrates are well known in the art. They include, by way of example, silicone-coated kraft paper and the like.

Tapes of the invention may also incorporate a low adhesion backsize (LAB). Typically this LAB is applied to the tape backing surface that is opposite that bearing the pressure-sensitive adhesive. LABs are known in the art.

This invention is further illustrated by the following examples that are not intended to limit the scope of the invention. In the examples, all parts, ratios and percentages are by weight unless otherwise indicated. The following test methods were used to evaluate and characterize the emulsion PSAs produced in the examples. All materials are commercially available, for example from Aldrich Chemicals, unless otherwise indicated or described.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| PSA-1 | Acrylic emulsion adhesive (FASTBOND 49) commercially available from 3M Company, St. Paul, MN. |
| PSA-2 | Latex adhesive, approximately 50% solids in water of a polymer composition comprising 80% isooctyl acrylate, 17% butyl acrylate and 3% methacrylic acid. |
| PSA-3 | ROBOND PS 2020 Adhesive commercially available from Rohm and Haas, Philadelphia, PA. |
| SNOWTEX UP | Silica particles available from Nissan Chemical Industries Ltd., Chiba - Prefecture, Japan. |
| SNOWTEX PS-S | String-of-pearl silica particles with a diameter of 10-15 nm and a length of 80-120 nm available from Nissan Chemical Industries Ltd., Chiba - Prefecture, Japan. |
| SNOWTEX PS-M | String-of-pearl silica particles with a diameter of 18-25 nm and a length of 80-150 nm available from Nissan Chemical Industries Ltd., Chiba - Prefecture, Japan. |
| PET | a primed polyester film of polyethylene terephthalate, 25.4 micrometers thick (1 mil). |
| CA | Cellulose acetate film, 38 micrometers thick (1.5 mils). |
| BOPP | Biaxially oriented polypropylene film, 36 micrometers thick (1.4 mils). |
| NALCO 2326 | Silica particles of approximately 5 nanometer size commercially available from Nalco, Naperville, IL. |
| NALCO 2327 | Silica particles of approximately 20 nanometer size commercially available from Nalco, Naperville, IL. |

Test Methods

Peel Adhesion Test

The test method used was similar to test method ASTM D 3330-78 except that a glass substrate was used in place of stainless steel. Tape samples were prepared by coating adhesives onto CA film or PET film and drying to give an adhesive dry coating thickness of about 25.4 micrometers (1 mil). Two 1.3 centimeter (0.5 inch) strips of these tapes were adhered to a glass plate by rolling a 2 kilogram (4.5 pounds) roller onto the tape. The two tape samples were averaged. Platen speed was 229 centimeters per minute (90 inches per minute). Peel force was measured in ounces per 0.5 inch and converted to Newtons per decimeter.

Shear Strength Test

The test method used was similar to test method ASTM D-3654-78, PSTC-7. Tape samples were prepared by coating adhesives onto CA, PET or BOPP films and drying to give an adhesive dry coating thickness of about 25.4 micrometers (1 mil). Strips of these tapes 1.3 centimeter (0.5 inch) wide were adhered to stainless steel plates and cut down to leave 1.3 centimeter by 1.3 centimeter (0.5 inch by 0.5 inch) square on the steel plates. A weight of 2 kilograms (4.5 pounds) was rolled over the adhered portion. A weight of 1,000 grams was attached to each sample which was suspended until the sample failed. The time of failure as well as the mode of failure was noted. Samples were run in triplicate and averaged. The tests were run at 23° C. and 50% relative humidity unless otherwise specified.

Viscosity Measurements

Viscosity for the adhesive emulsion solutions containing particles were measured at room temperature using a Brookfield viscometer. The viscosities were measured in centipoise and converted to Pascal seconds.

Example 1 and Comparative Example C1

For Example 1, PSA-1 was blended with differing amounts of SNOWTEX UP (by solids weight basis) as shown in Table 1 to form adhesive emulsion solutions. A sample with no SNOWTEX UP was also prepared as Comparative Example C1. Peel Adhesion and Shear Strength were measured for tapes prepared from these adhesive emulsion solutions as described in the test methods above using cellulose acetate film of 38 micrometers (1.5 mil) thickness.

TABLE 1

| Example | SNOWTEX UP (wt %) | Peel Adhesion (N/dm) | Shear Strength (minutes) | Shear Strength Mode of Failure |
|---|---|---|---|---|
| C1 | 0 | 35 | 330 | Cohesive |
| 1A | 2 | 33 | 1,152 | Cohesive |
| 1B | 3 | 31 | 1,781 | Cohesive |
| 1C | 4 | 34 | 3,058 | Cohesive |
| 1D | 5 | 28 | 5,576 | Cohesive |

Example 2 and Comparative Example C2

For Example 2, PSA-1 was blended with differing amounts of SNOWTEX UP (by solids weight basis) as shown in Table 2 to form adhesive emulsion solutions. A sample with no SNOWTEX UP was also prepared as Comparative Example C2. Peel Adhesion and Shear Strength were measured for tapes prepared from these adhesive emulsion solutions as described in the test methods above using PET film of 25.4 micrometers (1 mil).

TABLE 2

| Example | SNOWTEX UP (wt %) | Peel Adhesion (N/dm) | Shear Strength (minutes) | Shear Strength Mode of Failure |
|---|---|---|---|---|
| C2 | 0 | 25 | 170 | Cohesive |
| 2A | 1 | 25 | 280 | Cohesive |
| 2B | 2 | 25 | 717 | Cohesive |
| 2C | 3 | 25 | 1,874 | Cohesive |
| 2D* | 5 | 23 | 10,000 | Did not Fail |
| 2E | 6 | 20 | 10,000 | Did not Fail |
| 2F | 8 | 18 | 10,000 | Did not Fail |

TABLE 2-continued

| Example | SNOWTEX UP (wt %) | Peel Adhesion (N/dm) | Shear Strength (minutes) | Shear Strength Mode of Failure |
|---|---|---|---|---|

*Shear strength test was run at 70° C.

Example 3

Viscosity Measurements

The viscosity of particle-containing adhesive emulsion solutions of Comparative Example C1 and Examples 1A-1D were measured over time using the test method shown above. The results are shown in Table 3.

TABLE 3

| Adhesive Emulsion Sample | Initial viscosity (Pa s) | Viscosity after 1 day (Pa s) | Viscosity after 4 days (Pa s) | Viscosity after 14 days (Pa s) |
|---|---|---|---|---|
| C1 | 0.480 | 0.480 | 0.480 | 0.490 |
| 1A | 0.310 | 0.464 | 0.550 | 0.600 |
| 1B | 0.280 | 0.515 | 0.615 | 0.670 |
| 1C | 0.275 | 0.580 | 0.680 | 0.720 |
| 1D | 0.255 | 0.640 | 0.760 | 0.780 |

Example 4

For Example 4, PSA-2 was blended with differing amounts of PSA-3 (by weight) as shown in Table 4 to form adhesive emulsion solutions. These adhesive emulsion solutions were blended with 4 wt % (by solids weight basis) of SNOWTEX UP. Shear Strength was measured for tapes prepared from these adhesive emulsion solutions as described in the test method above using either CA or BOPP films as shown in Table 4.

TABLE 4

| Example | Backing Type | PSA-2 (wt %) | PSA-3 (wt %) | Shear Strength (minutes) | Shear Strength Mode of Failure |
|---|---|---|---|---|---|
| 4A | CA | 0 | 100 | 409 | Cohesive |
| 4B | CA | 100 | 0 | 6,262 | Cohesive |
| 4C | CA | 25 | 75 | 10,000 | Cohesive |
| 4D | BOPP | 5 | 95 | 357 | Cohesive |
| 4E | BOPP | 10 | 90 | 341 | Cohesive |
| 4F | BOPP | 15 | 85 | 583 | Cohesive |
| 4G | BOPP | 20 | 80 | 790 | Cohesive |
| 4H | BOPP | 25 | 75 | 8,396 | Cohesive |
| 4I | BOPP | 30 | 70 | 3,812 | Cohesive |

Example 5

For Example 5, PSA-1 was blended with differing amounts of PSA-3 (by weight) as shown in Table 5 to form adhesive emulsion solutions. These adhesive emulsion solutions were blended with 4 wt % (by solids weight basis) of SNOWTEX UP. Shear Strength was measured for tapes prepared from these adhesive emulsion solutions as described in the test method above using either BOPP film as shown in Table 5.

TABLE 5

| Example | Backing Type | PSA-1 (wt %) | PSA-3 (wt %) | Shear Strength (minutes) | Shear Strength Mode of Failure |
|---|---|---|---|---|---|
| 5A | BOPP | 5 | 95 | 311 | Cohesive |
| 5B | BOPP | 10 | 90 | 613 | Cohesive |
| 5C | BOPP | 30 | 70 | 2,321 | Cohesive |

Example 6 and Comparative Example C3

For Example 6, PSA-1 was blended with differing amounts of SNOWTEX PS-S (by solids weight basis) as shown in Table 6 to form adhesive emulsion solutions. A sample with no SNOWTEX PS-S was also prepared as Comparative Example C6. Peel Adhesion and Shear Strength were measured for tapes prepared from these adhesive emulsion solutions as described in the test methods above using PET film of 25.4 micrometers (1 mil).

TABLE 6

| Example | SNOWTEX PS-S (wt %) | Peel Adhesion (N/dm) | Shear Strength (minutes) | Shear Strength Mode of Failure |
|---|---|---|---|---|
| C3 | 0 | 24 | 169 | Cohesive |
| 6A | 1 | 22 | 238 | Cohesive |
| 6B | 2 | 21 | 338 | Cohesive |
| 6C | 3 | 21 | 358 | Cohesive |
| 6D | 5 | 23 | 2,784 | Cohesive |

Example 7 and Comparative Example C4

For Example 7, PSA-1 was blended with differing amounts of SNOWTEX PS-M (by solids weight basis) as shown in Table 7 to form adhesive emulsion solutions. A sample with no SNOWTEX PS-M was also prepared as Comparative Example C4. Peel Adhesion and Shear Strength were measured for tapes prepared from these adhesive emulsion solutions as described in the test methods above using PET film of 25.4 micrometers (1 mil).

TABLE 7

| Example | SNOWTEX PS-M (wt %) | Peel Adhesion (N/dm) | Shear Strength (minutes) | Shear Strength Mode of Failure |
|---|---|---|---|---|
| C4 | 0 | 24 | 169 | Cohesive |
| 7A | 1 | 26 | 269 | Cohesive |
| 7B | 2 | 27 | 239 | Cohesive |
| 7C | 3 | 27 | 242 | Cohesive |
| 7D | 5 | 28 | 409 | Cohesive |

Example 8 and Comparative Examples C5-C6

For Example 8, PSA-1 was blended with 1% SNOWTEX UP (by solids weight basis) and 1% of either NALCO 2327 or NALCO 2326 as shown in Table 8 to form adhesive emulsion solutions. For Comparative Examples C5 and C6 only NALCO 2327 or NALCO 2326 were blended with PSA-1 as shown in Table 8. Peel Adhesion and Shear Strength were measured for tapes prepared from these adhesive emulsion solutions as described in the test methods above.

TABLE 8

| Example | SNOWTEX UP (wt %) | NALCO 2326 (wt %) | NALCO 2327 (wt %) | Peel Adhesion (N/dm) | Shear Strength (minutes) | Shear Strength Mode of Failure |
|---|---|---|---|---|---|---|
| 2A | 1 | — | — | 25 | 280 | Cohesive |
| C5A | — | 1 | — | 24 | 624 | Cohesive |
| C6A | — | — | 1 | 22 | 339 | Cohesive |
| 2B | 2 | — | — | 25 | 717 | Cohesive |
| C5B | — | 2 | — | 24 | 1350 | Cohesive |
| C6B | — | — | 2 | 23 | 474 | Cohesive |
| 8A | 1 | 1 | — | 24 | 1518 | Cohesive |
| 8B | 1 | — | 1 | 23 | 1118 | Cohesive |

The invention claimed is:

1. A pressure-sensitive adhesive comprising:
   a) a polymer component comprising:
      i) 90 to 99 parts by weight of monomer units of an (meth)acrylic acid ester of non-tertiary alcohol, said alcohol having from 1 to 14 carbon atoms;
      ii) 1 to 10 parts by weight of monomer units of an acid functional monomer;
      iii) 0 to 10 parts by weight of monomer units of a second polar monomer;
      iv) 0 to 5 parts vinyl monomer units; and
      v) 0 to 1 part crosslinking agent; and
   b) 1 to 8 parts by weight, based on 100 parts of polymer, of silica nanoparticles having an average particle diameter of 9-25 nm with a length of 40-300 nm.

2. The pressure-sensitive adhesive of claim 1, wherein said silica nanoparticles are acicular.

3. The pressure-sensitive adhesive of claim 2 wherein said acicular silica nanoparticles are hydrophilic nanoparticles.

4. The pressure-sensitive adhesive of claim 2 wherein said acicular silica nanoparticles are not surface modified.

5. The pressure-sensitive adhesive of claim 2 wherein said acicular silica nanoparticles are surface modified by hydrophilic surface modifying agents.

6. The pressure-sensitive adhesive of claim 1 wherein said acid functional group of said acid functional monomer is partially neutralized in the polymer.

7. The pressure-sensitive adhesive of claim 1 wherein said second polar monomer is selected from 2-hydroxyethyl (meth)acrylate; N-vinylpyrrolidone; N-vinylcaprolactam; acrylamide; t-butyl acrylamide; dimethylamino ethyl acrylamide; N-octyl acrylamide; poly(alkoxyalkyl) acrylates including 2-(2-ethoxyethoxy) ethyl acrylate, 2-ethoxyethyl acrylate, 2-methoxyethoxyethyl acrylate, 2-methoxyethyl methacrylate, polyethylene glycol mono (meth)acrylates; poly(vinyl methyl ether); and mixtures thereof.

8. The pressure-sensitive adhesive of claim 1 wherein said polymer comprises 1 to 5 parts by weight of an acid functional monomer and 1 to 5 parts by weight of a second polar monomer.

9. The pressure-sensitive adhesive of claim 1 wherein said polymer is prepared as an aqueous emulsion polymer.

10. The pressure-sensitive adhesive of claim 1 wherein the acid functional monomer is selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropane sulfonic acid, vinyl phosphonic acid, and mixtures thereof.

11. The pressure-sensitive adhesive of claim 1 comprising 1 to 5 parts of a vinyl monomer selected from vinyl esters, styrene, substituted styrene, vinyl halide, vinyl propionate, and mixtures thereof.

12. The composition of claim 1 wherein said crosslinking agent is a multifunctional aziridine, isocyanate and epoxy crosslinking agent.

13. The composition of claim 2 wherein the acicular silica nanoparticles are surface modified and wherein less than 25% of the available surface functional groups are modified.

14. The composition of claim 1, wherein said polymer component comprises a mixture of polymers.

15. The composition of claim 1 with the average number of carbon atoms of the non-tertiary alcohol being from about 4 to about 12.

16. The composition of claim 2 further comprising 0 to 8 parts by weight of spherical silica nanoparticles having an average particle diameter of 20 nanometers or less.

17. The composition of claim 2 wherein up to 50% by weight of said acicular silica nanoparticles are substituted by spherical silica nanoparticles having an average particle diameter of 20 nanometers or less.

18. A method of preparing the pressure-sensitive adhesive of claim 1 comprising the step of blending a silica nanosol with an emulsion of the polymer component of claim 1.

19. The method of claim 18 wherein the polymer component is prepared by emulsion polymerization.

20. An adhesive article comprising the pressure-sensitive adhesive of claim 1 and a flexible backing layer.

21. The adhesive coated sheet article of claim 20 wherein the flexible backing layer is selected from paper, latex saturated paper, polymeric film, cellulose acetate film, ethyl cellulose film, woven or nonwoven cloth, metallic foil, and ceramic sheeting.

22. An emulsion comprising:
(a) 30 to about 70 weight percent, based on the total weight of the emulsion, of a polymer phase comprising the polymerization reaction product of:
   i. 90 to 98 parts by weight of an (meth)acrylic acid ester of non-tertiary alcohol, said alcohol having from 1 to 14 carbon atoms;
   ii. 1 to 10 parts by weight of an acid functional monomer;
   iii. 0 to 10 parts by weight of a second, non-acid functional, polar monomer;
   iv. 0 to 5 parts by weight of vinyl monomer;
   v. optionally 0.01 to 1 part by weight of a crosslinking agent,
   vi. 0 to 0.5 parts by weight of a chain transfer agent
   vii. 1 to 8 parts by weight of silica nanoparticles having an average particle diameter of 9-25 nm with a length of 40-300 nm, based on 100 parts of polymer, wherein the sum of (i) through (vii) is 100 parts by weight, and
(b) 30 to 70 weight percent of an aqueous phase comprising a surfactant, based on the total weight of the emulsion.

23. The emulsion of claim 22 wherein said composition has a pH of 3 to 6.

* * * * *